UNITED STATES PATENT OFFICE.

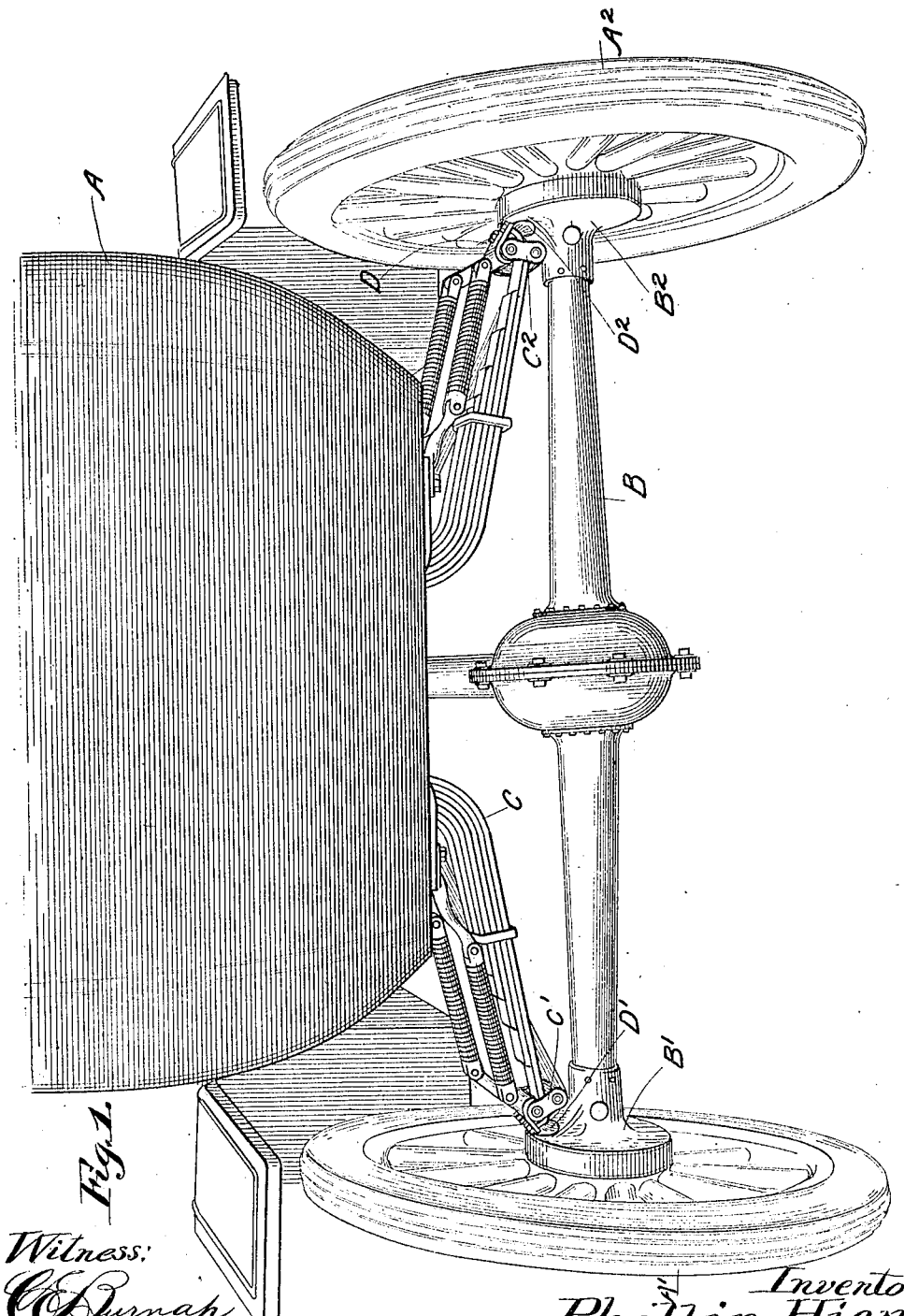

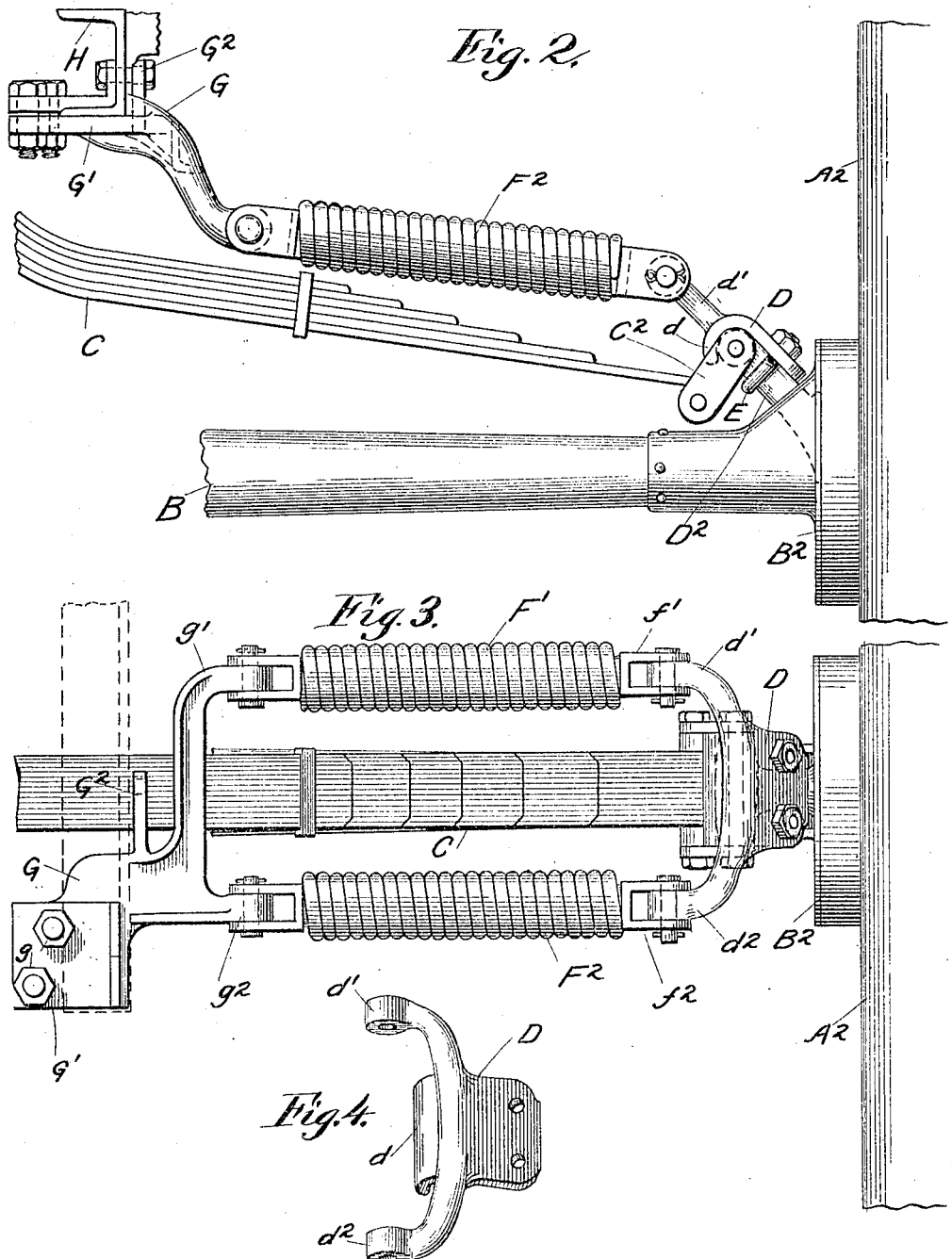

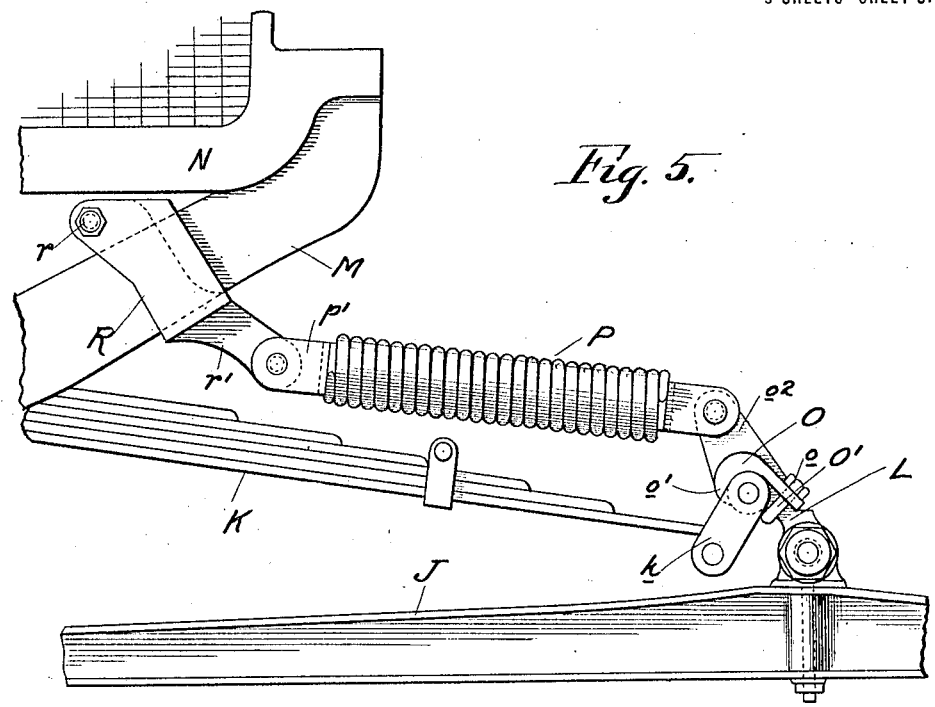
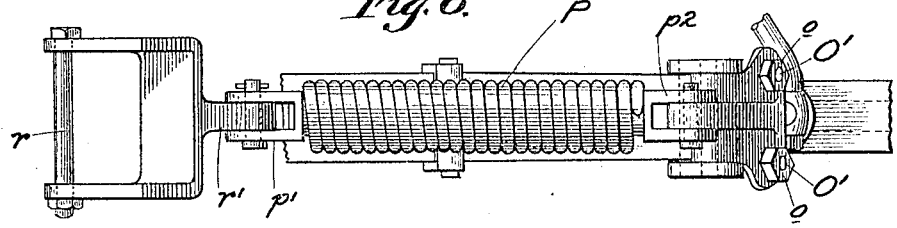
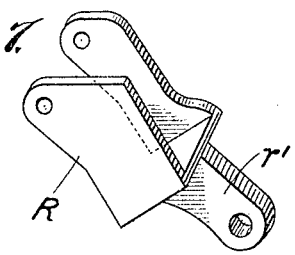 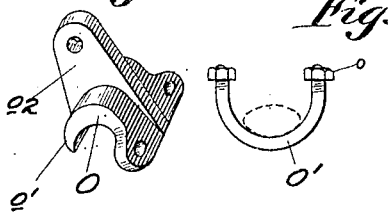

PHILLIP HIEN, OF CHICAGO, ILLINOIS.

SHOCK-ABSORBER.

1,291,514. Specification of Letters Patent. Patented Jan. 14, 1919.

Application filed June 7, 1916. Serial No. 102,285.

*To all whom it may concern:*

Be it known that I, PHILLIP HIEN, a citizen of the United States, residing at Chicago, in the county of Cook and State of Illinois, have invented certain new and useful Improvements in Shock-Absorbers, of which the following is a specification.

My invention relates in general to vehicle springs, and more particularly to auxiliary springs for stiffening the usual vehicle springs when subjected to excessive compression and for dampening their recoil.

Vehicle springs, and more especially automobile springs, of the requisite resiliency for easy riding over roads of ordinary evenness are entirely too flexible to protect the occupants of the vehicle from a sudden jolt incident to the wheel dropping into an unusually deep rut or hitting a large stone or other obstruction, as under such conditions the springs close and immediately recoil, often throwing the occupants of the vehicle from their seats. On the other hand, if the springs are so stiff as not to close under usual road conditions, they are not resilient enough under ordinary road conditions to make the vehicle easy riding.

Another objection to the springs of a type of automobile now in general use in which each end of the body is supported upon a transverse semi-elliptical spring, connected at its ends by shackles with the axle, is that the shackles necessarily permit the longitudinal movement, or side sway, of the vehicle body.

The primary object of my invention is to provide auxiliary spring shock absorbers, which will gradually retard the compression and also the recoil, of the usual vehicle springs, the degree of such retardation increasing in proportion to the extent of compression or recoil of the usual springs.

A further object of my invention is to provide spring shock absorbing devices for the type of automobile in which the ends of the body are supported on transverse semi-elliptical springs, having their ends connected by swinging shackles, with the ends of the axles, which will not only resist excessive compression and recoil of the springs, but will also resist the tendency of the automobile body to sway transversely.

A still further object of my invention is to provide a reinforcing device for vehicle springs, which will be simple in construction, inexpensive in manufacture, convenient in attachment, and efficient in use.

My invention will be more fully disclosed hereinafter, with reference to the accompanying drawings, in which the same is illustrated as embodied in two convenient and practical forms, and in which—

Figure 1 is a rear elevational view of an automobile equipped with my invention;

Fig. 2 an enlarged rear elevational view of a portion of one side of an automobile to which my invention is attached;

Fig. 3 a plan view looking downwardly with respect to Fig. 2;

Fig. 4 a perspective view of one of the brackets, to which are secured the ends of the springs at one side of the vehicle;

Fig. 5 a view similar to Fig. 2, showing a modified form of my invention, particularly adapted for the front spring of the automobile;

Fig. 6 a plan view of the form of the invention shown in Fig. 5;

Fig. 7 a perspective view of one of the spring supporting brackets;

Fig. 8 a perspective view of the other spring supporting bracket;

Fig. 9 a detail view showing the U-shaped bolt for connecting the bracket shown in Fig. 8, in operative position.

Similar reference characters are used to designate similar parts in the several figures of the drawings.

Reference letter A indicates the body of an automobile, and B the casing of the rear axle. $A^1$ and $A^2$, are the rear wheels. C designates the semi-elliptical spring for supporting the rear of the automobile body upon the casing of the rear axle. The ends of the springs C, are connected by shackles $C^1$ and $C^2$, with hanger brackets $D^1$ and $D^2$, projecting upwardly and inwardly from the end members, $B^1$ and $B^2$ of the axle casing B.

The automobile construction above described does not, in itself, constitute my invention, but is illustrated in order that the construction and operation of my invention may be clearly understood.

Secured to each of the hanger brackets, $D^1$ and $D^2$ is a supplemental bracket D, comprising a flat portion which over-lies the hanger bracket and is rigidly secured thereto by a U-bolt E, extending around the hanger bracket, and passing through holes in the overlying portion of the supplemental bracket, nuts being provided on the screw threaded ends of the U-bolt, to tightly clamp the supplemental bracket to the hanger bracket. In order to more firmly secure the supplemental bracket to the hanger bracket, the former is provided with a curved flange $d$, which extends around the curved inner portion of the hanger bracket, and lies between the side members of the shackles. The supplemental bracket D is also provided with upwardly projecting jaws $d^1$ and $d^2$, each of which is provided with a horizontal opening therethrough. Pivotally secured to each of the portions $d^1$ and $d^2$ of the bracket D, is one end of a coiled spring. Reference characters $F^1$ and $F^2$ designate the coiled springs, which are secured to portions $d^1$ and $d^2$ of the bracket D, by any suitable means, such, for instance as clevises $f^1$ and $f^2$. The opposite ends of the springs $F^1$ and $F^2$ are pivotally connected by suitable means, such, for instance, as clevises to the portions $g^1$ and $g^2$ of a bracket G, which is suitably secured to the underframe of the vehicle above the spring C. Any suitable means may be provided for supporting the bracket G, such, for instance, as by providing a horizontal flange $G^1$ thereon through which bolts $g$ extend, and also by providing a lug $G^2$, which is bolted to the underframe H of the automobile.

When the automobile is unloaded, the upper ends of the jaws $d^1$ and $d^2$ of the supplemental bracket D lie in a horizontal plane, slightly below the horizontal plane of the end portions $g^1$ and $g^2$ of the bracket G as shown in Fig. 2. The springs $F^1$ and $F^2$ are preferably under slight tension when the automobile is unloaded, but when the automobile carries its normal load, the lowering of the body, and with it the bracket G depresses the inner ends of the springs $F^1$ and $F^2$, so that the said springs are in substantially a horizontal plane and under no tension.

While I have above described the shock absorber applied to one side of the back of the automobile, it will be understood by referring to Fig. 1, that duplicate auxiliary spring devices are provided at the opposite sides of the rear of the automobile.

The operation of my improved shock absorber, above described, is as follows:

When the spring C is moved from substantially normal position, as, for instance, in compression when the wheels encounter obstruction or in recoil when the wheels drop into ruts, the auxiliary springs $F^1$ and $F^2$ are expanded, owing to their ends being moved into relatively different horizontal planes. The movement of the automobile spring is consequently resisted, such resistance increasing with the increase in the movement of the automobile spring. When the automobile spring recoils, the relative movements of the brackets G and D, causes the inner ends of the springs $F^1$ and $F^2$ to move into a higher horizontal plane than the outer ends of such springs, thereby placing the springs under tension, so as to resist the recoil of the vehicle spring, such resistance increasing with the increase in the recoil of the vehicle spring.

It will further be observed that my improved shock absorbing devices serve to resist the side sway of the automobile body, inasmuch as any side sway must necessarily place under tension one pair of auxiliary springs. In the type of automobile to which my invention is applied, the side sway of the body is necessarily present owing to the pairs of shackles which connect the ends of the automobile spring with the ends of the axle. The prevention of side sway of the automobile body by my invention is therefore of importance.

In Figs. 5 to 9, inclusive, I have illustrated another form of my invention, which is primarily adapted for the front semi-elliptical spring of the vehicle. Referring to said figures, J indicates the front axle and K the front semi-elliptical spring which supports the front of the vehicle body at its center, and is pivotally connected at each end by shackles $k$ with a hanger bracket L. M indicates the frame which extends beneath the front of the automobile and supports the same upon the center of the semi-elliptical spring. N indicates a portion of the radiator at the front of the automobile. The automobile construction above described is well known, but is illustrated and briefly described in order to fully disclose the application thereto of my invention.

O designates a supplemental bracket which is rigidly secured to the hanger bracket L, by means of a U-bolt $O^1$, which extends around the hanger bracket L and passes through holes in the over-lying portion of the bracket O, nuts $o^1$ being provided on the screw threaded ends of the U-bolt to tightly clamp the bracket O to the hanger bracket L. In order to still further rigidly secure the bracket O in position on the hanger bracket L, the former is provided with a curved portion $o^1$, which extends partially around the inner curved portion of the hanger bracket L. The supplemental bracket O is provided with an upwardly and inwardly projecting lug $o^2$, to which is pivotally connected one end of a coiled spring P, a clevis $p^2$ being shown as the means for pivotally connecting the lug $o^2$ with the adjacent end of the spring P.

The opposite end of the spring P is pivotally connected, as by means of a clevis $p^1$ with a lug $r^1$ projecting downwardly and outwardly from the yoke R, which surrounds and is tightly secured to the adjacent portion of the supporting frame M.

Any suitable means may be provided for attaching the yoke R to the frame M, such, for instance, as a bolt r extending through openings in the upper ends of the yoke and thereby clamping the yoke tightly around the frame member to which it is attached.

When the automobile is unloaded, the positions of the supplemental bracket O and yoke R are preferably such that the auxiliary spring P occupies a slightly inclined position under tension, as shown in Fig. 5. When the automobile contains its normal load, the downward movement of the yoke R lowers the inner end of the auxiliary spring P, so that it then occupies a substantially horizontal position without tension. It will be understood that Fig. 5 merely shows one-half of the equipment, both sides of the front of the automobile being provided with the same shock absorbing mechanism, illustrated in Figs. 5 and 6.

The operation of the form of my invention shown in Figs. 5 to 9, is the same as above described in connection with the form of my invention shown in Figs. 1 to 4.

From the foregoing description, it will be seen that my improved shock absorbing auxiliary spring devices may be readily attached to automobiles of the construction illustrated without disassembling any of the parts of the automobile. It will further be seen that my invention reinforces the semi-elliptical automobile springs, so as to resist their excessive compression as well as their excessive recoil, without however unduly stiffening the automobile springs during their ordinary operation.

What I claim is:

1. The combination with a body of a vehicle, of axles beneath the front and rear ends of the body, semi-elliptical springs interposed between and connecting the body with the axles, brackets secured to the body of the vehicle in spaced relation to the semi-elliptical spring connections, brackets secured to the axles at the spring connections and auxiliary springs connected to the adjacent body and axle brackets.

2. The combination with the body of a vehicle, of axles beneath the front and rear ends of the body, substantial semi-elliptical springs secured adjacent their centers to the body and at their ends to the underlying axles, and auxiliary springs substantially parallel with said semi-elliptical springs connected at their inner ends to the body and at their outer ends to the axles at the elliptical spring connections.

3. The combination with the body of a vehicle of an axle beneath one end thereof, semi-elliptical springs interposed between and connecting the body with said axle, and auxiliary springs substantially parallel with said semi-elliptical springs, connected at opposite ends to the body and to the axle, the latter connections being at the elliptical spring connections.

4. The combination with the body of a vehicle, of an axle beneath one end thereof, a semi-elliptical spring connected at its center to the vehicle body and at its ends to the axle, substantially horizontal coiled springs on the opposite sides of the semi-elliptical spring, and means for connecting the inner end of each of said coiled springs to the vehicle body and its outer end to the axle.

5. The combination with the body of a vehicle, of an axle beneath one end thereof, a semi-elliptical spring connected at its center to the vehicle body, hanger brackets adjacent the ends of the axle to which the ends of the semi-elliptical springs are pivotally connected, coiled springs on opposite sides of the semi-elliptical spring, means for connecting the inner ends of said coiled springs to the vehicle body, and supplemental brackets secured to said hanger brackets to which the outer ends of said coiled springs are secured.

6. The combination with the body of a vehicle, of an axle beneath one end thereof, a semi-elliptical spring connected at its center to the vehicle body, hanger brackets adjacent the ends of the axle to which the ends of the semi-elliptical springs are pivotally connected, a pair of substantially horizontal coiled springs on each side of said semi-elliptical spring, means for connecting the inner ends of the coiled springs to the vehicle body, and supplemental brackets secured to said hanger brackets to which the outer ends of said pair of coiled springs are secured.

7. The combination with a body of a vehicle of an axle beneath one end thereof, a semi-elliptical spring connected at its center to the vehicle body and at its ends to the axle, substantially horizontal coiled springs on opposite sides of the connection between the semi-elliptical spring and the vehicle body and joined to the connections at the outer ends of the elliptical spring, and means for connecting the inner end of each of the said coiled springs to the vehicle body and the outer ends to the axle.

In testimony whereof, I have subscribed my name.

PHILLIP HIEN.

Copies of this patent may be obtained for five cents each, by addressing the "Commissioner of Patents, Washington, D. C."